US009247208B2

(12) United States Patent
Gemelos et al.

(10) Patent No.: US 9,247,208 B2
(45) Date of Patent: Jan. 26, 2016

(54) ADAPTIVE VIDEO-SERVER RECONFIGURATION FOR SELF-OPTIMIZING MULTI-TIER IPTV NETWORKS

(75) Inventors: Steven Gemelos, San Jose, CA (US); Canhui Ou, Danville, CA (US); Zhi Li, San Ramon, CA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 1766 days.

(21) Appl. No.: 11/493,479

(22) Filed: Jul. 25, 2006

(65) Prior Publication Data

US 2008/0046912 A1 Feb. 21, 2008

(51) Int. Cl.

| | |
|---|---|
| H04N 21/2385 | (2011.01) |
| H04N 21/442 | (2011.01) |
| H04N 21/462 | (2011.01) |
| H04N 7/173 | (2011.01) |
| H04H 20/12 | (2008.01) |
| H04H 60/31 | (2008.01) |
| H04H 60/66 | (2008.01) |
| H04N 21/222 | (2011.01) |
| H04N 21/2225 | (2011.01) |
| H04N 21/24 | (2011.01) |
| H04N 21/647 | (2011.01) |
| H04H 20/06 | (2008.01) |

(52) U.S. Cl.
CPC ........... *H04N 7/17318* (2013.01); *H04H 20/12* (2013.01); *H04H 60/31* (2013.01); *H04H 60/66* (2013.01); *H04N 21/2221* (2013.01); *H04N 21/2225* (2013.01); *H04N 21/2385* (2013.01); *H04N 21/2405* (2013.01); *H04N 21/44222* (2013.01); *H04N 21/4622* (2013.01); *H04N 21/64761* (2013.01); *H04H 20/06* (2013.01)

(58) Field of Classification Search
CPC ............... H04N 21/4383; H04N 21/44222; H04N 21/4622; H04N 21/2385
USPC ......... 725/116, 9, 10, 14, 105, 114–115, 127, 725/143–146
See application file for complete search history.

(56) References Cited

U.S. PATENT DOCUMENTS

| | | | | |
|---|---|---|---|---|
| 5,892,915 | A * | 4/1999 | Duso et al. ................ | 709/219 |
| 6,279,040 | B1 | 8/2001 | Ma et al. | |
| 6,816,904 | B1 | 11/2004 | Ludwig et al. | |
| 6,909,726 | B1 * | 6/2005 | Sheeran ................... | 370/468 |
| 6,986,156 | B1 * | 1/2006 | Rodriguez et al. ........... | 725/95 |
| 7,143,430 | B1 * | 11/2006 | Fingerman et al. ........... | 725/87 |
| 7,278,153 | B1 * | 10/2007 | Sanders .................... | 725/115 |
| 2002/0199200 | A1 * | 12/2002 | Addington ................. | 725/97 |
| 2003/0101451 | A1 * | 5/2003 | Bentolila et al. ............. | 725/34 |
| 2003/0217365 | A1 * | 11/2003 | Caputo ..................... | 725/95 |
| 2004/0010588 | A1 | 1/2004 | Slater et al. | |
| 2004/0226044 | A1 * | 11/2004 | Goode ..................... | 725/95 |
| 2005/0149964 | A1 * | 7/2005 | Thomas et al. .............. | 725/9 |
| 2005/0276284 | A1 * | 12/2005 | Krause et al. .............. | 370/538 |
| 2005/0289618 | A1 * | 12/2005 | Hardin ..................... | 725/95 |
| 2007/0130601 | A1 * | 6/2007 | Li et al. .................... | 725/112 |
| 2007/0143808 | A1 * | 6/2007 | Agrawal et al. ............. | 725/119 |

* cited by examiner

*Primary Examiner* — Mark D Featherstone
*Assistant Examiner* — Jason Thomas
(74) *Attorney, Agent, or Firm* — Guntin & Gust, PLC; Douglas Schnabel

(57) ABSTRACT

Various embodiments of the disclosed subject matter provide apparatus, methods, and systems including an input to receive data associated with a channel viewership of a network; a distribution unit coupled to the input, the distribution unit to determine one or more relative viewership distributions based on the data; and a configuration unit coupled to the distribution unit, the configuration unit to provide one or more reconfiguration settings for one or more reconfigurable servers coupled to the network.

28 Claims, 10 Drawing Sheets

ADAPTIVE VIDEO-SERVER RECONFIGURATION FOR SELF-OPTIMIZING MULTI-TIER IPTV NETWORKS

TECHNICAL FIELD

The disclosed subject matter relates to the field of network communications, and more particularly to apparatus, methods, and systems including adaptive reconfiguration of servers included in networks.

BACKGROUND

A traditional cable television distribution network includes a network designed to provide subscribers with standard cable video channels. The cable television network may include a hierarchy of networks including video servers linked by one or more networks. The standard approach is to place all the servers in a centralized cluster to serve a market area. An example market area may be the Bay Area in California.

The centralized cluster is generally called a Video-Hubbing Office (VHO). The VHO may receive national content from a national network, wherein the national network receives the national content, for example, by satellite. The received national content is encoded and distributed to the local markets for transport. The local markets may include a VHO coupled to additional routers and video servers. In addition, a VHO may include regional routers and video servers coupled to one or more local switches. The VHO, in addition to receiving the national content, receives local content. The local content is prepared for distribution along with the national content through the regional routers and video servers, the local switches, and any other networks coupling the VHO with the subscribers.

In the traditional cable television distribution network, the video equipment, for example the servers and the routers, are very expensive, whereas the distribution network is relatively less expensive. The actual transmission of the broadcast video signal uses cables (fiber and coax), splitters, and amplifiers to carry, split, and boost the broadcast video signal to reach as many subscribers as possible. In this system, the addition of new customers only requires the addition of more cables, splitters, and amplifiers.

However, this cable distribution network provides very limited functionally. For example, the above-described system cannot easily provide individual content, such as video-on-demand or network-based PVR, or advanced video services offered by, for example, by Internet Protocol Television (IPTV). In addition, the network's cost model used as the foundation in designing the cable television distribution network described above does not apply to the more advanced transmission networks used to provide more advanced functionality and more advanced services.

DETAILED DESCRIPTION

Figure 1:
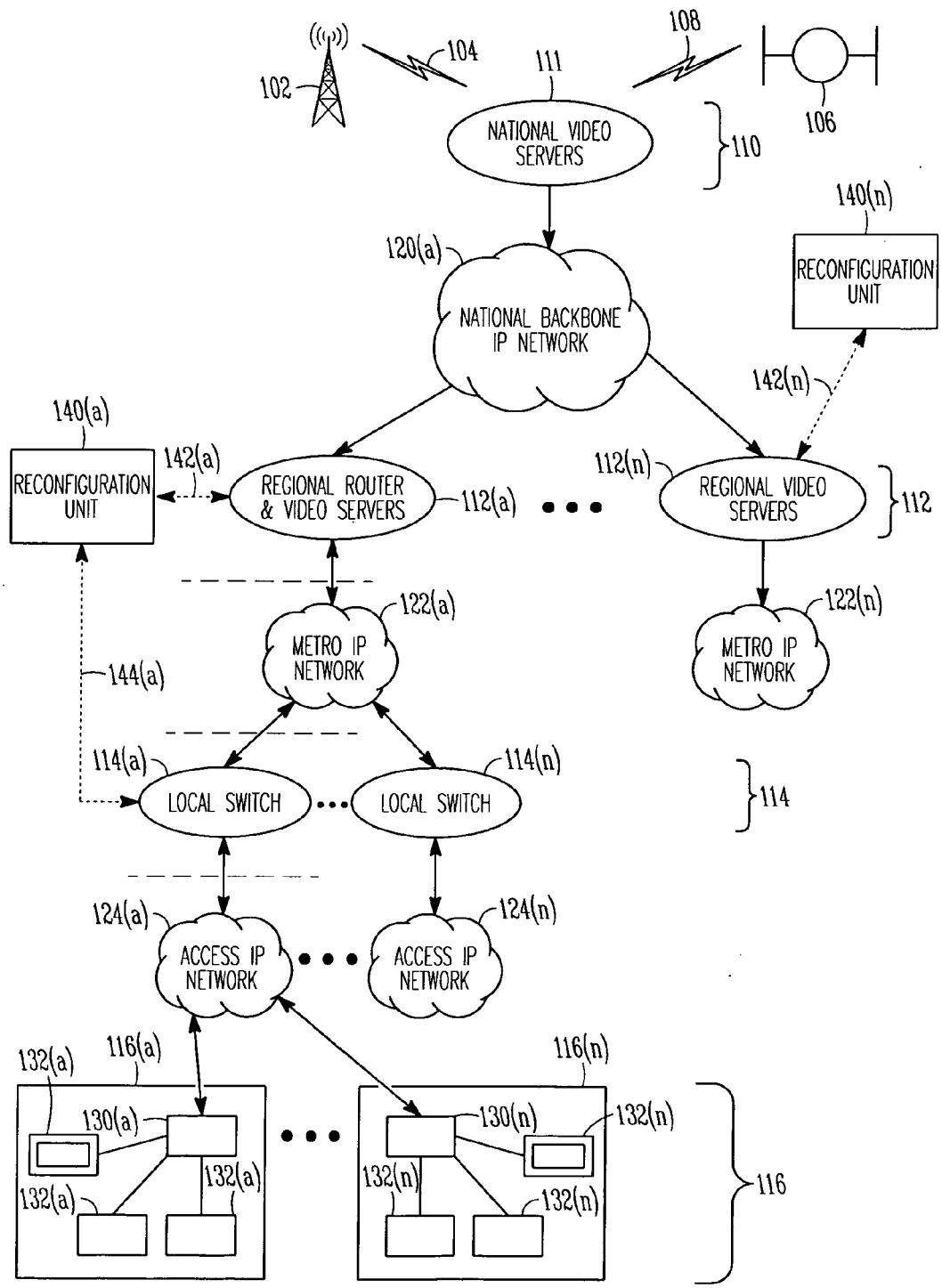
FIG. 1 illustrates an example embodiment of a network in accordance with the disclosed subject matter hereof.

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter. The leading digit(s) of reference numbers appearing in the FIG.ures generally corresponds to the FIG.ure number in which that component is first introduced, such that the same reference number is used throughout to refer to an identical component which appears in multiple FIG.ures. Signals and connections may be referred to by the same reference number or label, and the actual meaning will be clear from its use in the context of the description.

As described below, an apparatus, system, and method for adaptive video-server reconfiguration for self-optimizing multi-tier networks is disclosed.

In the disclosure below, reference is made to one or more channels provided on a network. Channels may be any type of indication used by the subscribers on the network to differentiate between a plurality of signals provided on the network. Channels as used in the disclosure below may include, but are not limited to, one or more numbers assigned to each of a plurality of signals being provided on the network. Channels as used in the disclosure below may include, but are not limited to, channels defined by various frequencies of transmission used to provide the broadcast signals in a traditional television system. In various embodiments, a particular channel may provide a plurality of different signals on the one channel based on selections or indications provided by a plurality of subscribers. For example, a particular channel may provide a plurality of "on-demand" type signals to a plurality of subscribers, each subscriber receiving a unicast signal based on a selection or indication made by that particular subscriber, over the one channel.

In the disclosure below, reference is made to reconfigurable servers. Reconfigurable servers are not limited to any particular type of servers, and in various embodiments may include video servers. In addition, reference is made in the disclosure below to broadcast signals. Broadcast signals are not limited to any particular type of signal, and include any signal that is provided on at least one channel in a network and are provided regardless of whether any subscribers on the network have turned to the at least one channel providing the broadcast signal, and are further provided regardless of whether any one of the subscribers on the network have specifically requested the broadcast signal.

In various embodiments, the broadcast signal will be provided on at least one channel of the network based on a pre-defined schedule with regards to date and time for providing the broadcast signal. In various embodiments, the broadcast signal in not permanently stored on the network, with the exception of temporary buffering of the broadcast signal in order to prevent a blackout of the channel when a subscriber first tunes to a channel providing the broadcast signal, or in order to provide lost packets to a subscriber tuned to the channel providing the broadcast signal when a particular subscriber indicates that they have not received packets (packets have been lost) associated with the broadcast signal.

FIG. 1 is an example embodiment of a network 100. In various embodiments, network 100 is an IPTV video distribution network. Network 100 is capable of providing advanced services to one or more subscribers. Advanced services include, but are not limited to, providing individualized content to the one or more subscribers coupled to the network. Individualized content includes, but is not limited to, video-on-demand and network based PVR. Advanced services include, but are not limited to, services associated with IPTV.

As illustrated in FIG. 1, network 100 includes routing and switching elements, including one or more video servers, included in network 100. Further, one or more different types of servers may be included in network 100. In various embodiments, the different types of servers may include, but are not limited to, video-acquisition servers (A-servers), video-distribution servers (D-servers), video-on-demand servers (V-servers), as well as interactive host servers. In addition, network 100 includes one or more reconfigurable servers as described in more detail below.

The introduction of IPTV with the addition of routing and switching elements in network 100 changes the cost function of the video distribution network. In place of splitters and amplifiers used to add new subscribers in the traditional cable TV distribution system, the advanced networks, such as network 100 use elements such as routers, switches, power supplies, and network interface cards when adding new customers. These elements result in a change in the network cost function.

Network 100 includes network tiers 110, 112, 114, and 116. Although only four network tiers are shown in FIG. 1, more or less tiers may be included in network 100 without changing the scope of the invention. Network tier 110 includes one or more national video servers 111. Network tier 110 is coupled to one or more regional routers and video servers 112(a)-112(n) through the national backbone IP network 120(a).

National backbone IP network 120(a) is shown as a single network. However, national backbone IP network 120(a) may include one or a plurality of networks used to connect the national video server 111 with one or more regional routers and video servers 112(a)-112(n). In addition, national backbone IP network 120(a) is not limited to a particular type of network. The national backbone IP network 120(a) may include any type or types of networks suitable for transmitting the signals present on network 100.

Network tier 112 includes one or more regional routers and video servers 112(a)-112(n). In one embodiment, not all of the regional routers and video servers 112(a)-112(n) included routers. For example, regional video server 112(n) is shown as not including a regional router.

Network tier 112 is coupled to network tier 114 through one or more metro IP networks 122(a)-122(n). As illustrated in FIG. 1, regional routers and video server 112(a) is coupled to local switches 114(a)-114(n) through metro IP network 122(a). Metro IP networks 122(a)-122(n) include aggregation and branching points for efficient video distribution.

Connections to local switches from metro IP network 122(n) are not shown in FIG. 1 for the sake of simplicity. However, it would recognize that one or more local switches may also be coupled to metro IP network 122(n) without changing the scope of the invention.

In various embodiments, network tier 112 also includes one or more reconfiguration units 140(a)-140(n). Reconfiguration units 140(a)-140(n) may be used to receive and store data related to viewership on network 100, as explained in further detail below. Reconfiguration units 140(a)-140(n) may be used to reconfigure one or more servers on network 100, as explained in further detail below.

Reconfiguration unit 140(a) is shown as coupled to regional router and video servers 112(a) by dotted line 142(a). Reconfiguration unit 140(n) is shown as coupled to regional video servers 112(n) by dotted line 142(n). However, coupling of reconfiguration units 140(a)-140(n) to network 100 is not limited to a coupling from reconfiguration units 140(a)-140(n) to the regional router and video servers 112(a)-112(n). In various embodiments, connection of reconfiguration units 140(a)-140(n) may be made to any portion of network 100. In various embodiments, reconfiguration unit 140(a) is coupled to local switch 114(a) through dotted line 144(a). In various embodiments, reconfiguration unit 140(a) may be coupled to both regional routers and video servers 112(a) and local switch 114(a).

Dotted lines 142(a)-142(n) and 144(a) are not limited to any particular type of physical interconnect. Dotted lines 142(a)-142(n) and 144(a) may include any type of interconnect appropriate for transferring signals between reconfiguration units 140(a)-140(n) and network 100. In various embodiments, one or more of dotted lines 142(a)-142(n) and 144(a) are wireless connections.

In various embodiments, one or more of dotted lines 142(a)-142(n) and 144(a) include a manual transfer of information such as, but not limited to, reconfiguration settings, and information related to viewership. Various embodiments include storing information from one or more reconfiguration units 140(a)-140(n) on a storage media, such as a floppy disk or a memory stick, and manually transferring the information to network 100 by coupling the storage media to one or more points in network 100 adapted to couple to the storage media. Various embodiments include storing information on a storage media from network 100, including, but not limited to, viewership information, and manually transferring the information to one or more reconfiguration units 140(a)-140(n) by coupling the storage media to one or more points included in reconfiguration units 140(a)-140(n) adapted to couple to the storage media. Manual transfers using a storage device may also be used for information transfers between reconfiguration units 140(a) and local switch 114(a) as described above and as represented by dotted line 144(a).

Network tier 114 is coupled to network tier 116 through one or more access IP networks 124(a)-124(n). Network tier 116 includes subscribers 116(a)-116(n). Subscribers 116(a)-116(n) may include interface devices 130(a)-130(n) allowing subscribers 116(a)-116(n) to couple to access IP networks 124(a)-124(n) and to receive signals and transfer requests to and from one or more subscriber devices 132(a)-132(n). In various embodiments, interface devices 130(a)-130(n) are set-top boxes. Subscriber devices 132(a)-132(n) are not limited to any particular types of devices, and may include an IPTV, a computer, a laptop, a video game, a telephone, a cellular phone, or a personal digital assistant. Each subscriber may have one or a plurality of devices coupled to the access IP network 124(a)-124(n). In some examples, the connection may include one or a plurality of wireless connections.

In operation, and in one example, one or more signals 104 may be transmitted from an antenna 102 and received at network tier 110. In another example, one or more signals 108 may be transmitted from a satellite 106 and received at network tier 110. The content of the signals received is encoded, and distributed though the national backbone IP network 120(a) to the regional and local markets represented by network tiers 112, 114, and 116.

At network tier 112, the national content is received. In some examples, local content is received from one or more sources (not shown) and prepared for distribution to the subscribers 116(a)-116(n). Various types of routers and servers are included in the regional routers and video servers 112(a)-112(n) as described above. The routers and servers at network tier 112 are configured so as to provide both the national content, the local content, and any additional content that may be available on the regional routers and video servers 112(a)-112(n) to subscribers 116(a)-116(n) through any of the portions of network 100 coupling the regional routers and video servers 112(a)-112(n) to the subscribers 116(a)-116(n).

In various embodiments, regional routers and video servers 112(a)-112(n) may receive requests from one or more subscribers 116(a)-116(n). Requests may include a request by a subscriber 116(a)-116(b) to receive the broadcast stream provided on a particular channel. Requests may include a request by a subscriber to receive a video stream available from one or more of the servers included in regional routers and video servers 112(a)-112(n). The requests from subscribers may be responded to by regional routers and video servers 112(a)-112(n) by providing the requested broadcast stream, either as a multi-cast stream or as a unicast stream, to the portion of network 100 coupling the regional routers and video servers 112(a)-112(n) to the requesting subscribers.

In various embodiments, each broadcast stream (broadcast signal including a video stream provided on a channel) passes through the network via IP multicast from a server in the network. In various embodiments, the server providing the IP multicast is an A-server located in the VHO, and can provide a multicast signal including the broadcast signal to all subscribers on the network that request the channel providing the broadcast signal. When a subscriber first switches to a new channel, for example the channel providing a particular broadcast signal, the interface devices 130(a)-130(n) associated with the subscriber contacts one or more D-servers to initiate an instant channel change. As noted above, in various embodiments, the interface device is a set-top box. In order to provide an instant channel change, the D-server may buffer a certain amount of the broadcast signal, for example several seconds of the broadcast signal, and will provide the buffered broadcast signal to the subscriber changing to the new channel until the subscriber can be handed over to the A-server providing the multicast. In various embodiments, the buffered broadcast signal provided by the D-server may be a unicast signal provided to the particular subscriber who recently changed to the channel providing the particular broadcast signal.

In addition, if while tuned to a particular channel, a subscriber does not receive some of the data packets included in the broadcast signal, the interface device associated with the subscriber may contact one or more D-servers to recover the lost packets. In this instance, the D-server is adapted to provide lost data packets to the requesting subscriber until the subscriber can again be handed over to the server providing the multicast of the broadcast signal being provided on the particular channel to which the subscriber is tuned. In various embodiments, the lost data packets are provide by the D-server as a unicast signal to the particular subscriber that indicated the loss of data packets.

In various embodiments, each subscriber maintains a list of the D-servers to contact when requesting a channel change or when requesting lost data packets associated with any particular broadcast signal provided on a channel of the network. In various embodiments, two or more D-servers may be provided for each channel providing broadcast signals on the network.

In various embodiments, a determination as to which server in the regional routers and video servers 112(a)-112(n) is to provide the requested channel to the subscriber is made by configuration settings included in the regional routers and video servers 112(a)-112(n). Configuration settings include a setting provided to the servers that direct the servers as to which broadcast video stream or streams a particular server is to provide to network 100. In various embodiments, directing the server as to which broadcast video stream or streams to provide includes providing a channel assignment to a reconfigurable server. In various embodiments, configuration units 140(a)-140(n) provide reconfiguration settings to one or more servers in regional routers and video servers 112(a)-112(n). In various embodiments, reconfiguration settings are used to modify the configuration settings of one or more of the servers included in the regional routers and video servers 112(a)-112(n). In various embodiments, reconfiguration settings are associated with a particular time during which the reconfiguration settings are to be applied, as explained in further detail below.

At network tier 114, national and local content is received at the local switches 114(a)-14(n). The local switches 114(a)-14(n) may perform aggregation and branching functions before passing the national and local content on to subscribers in network tier 116 through the access IP networks 124(a)-124(n). In various embodiments, the local switches also include one or more reconfigurable servers, as described in further detail with respect to FIG. 4.

Figure 2:
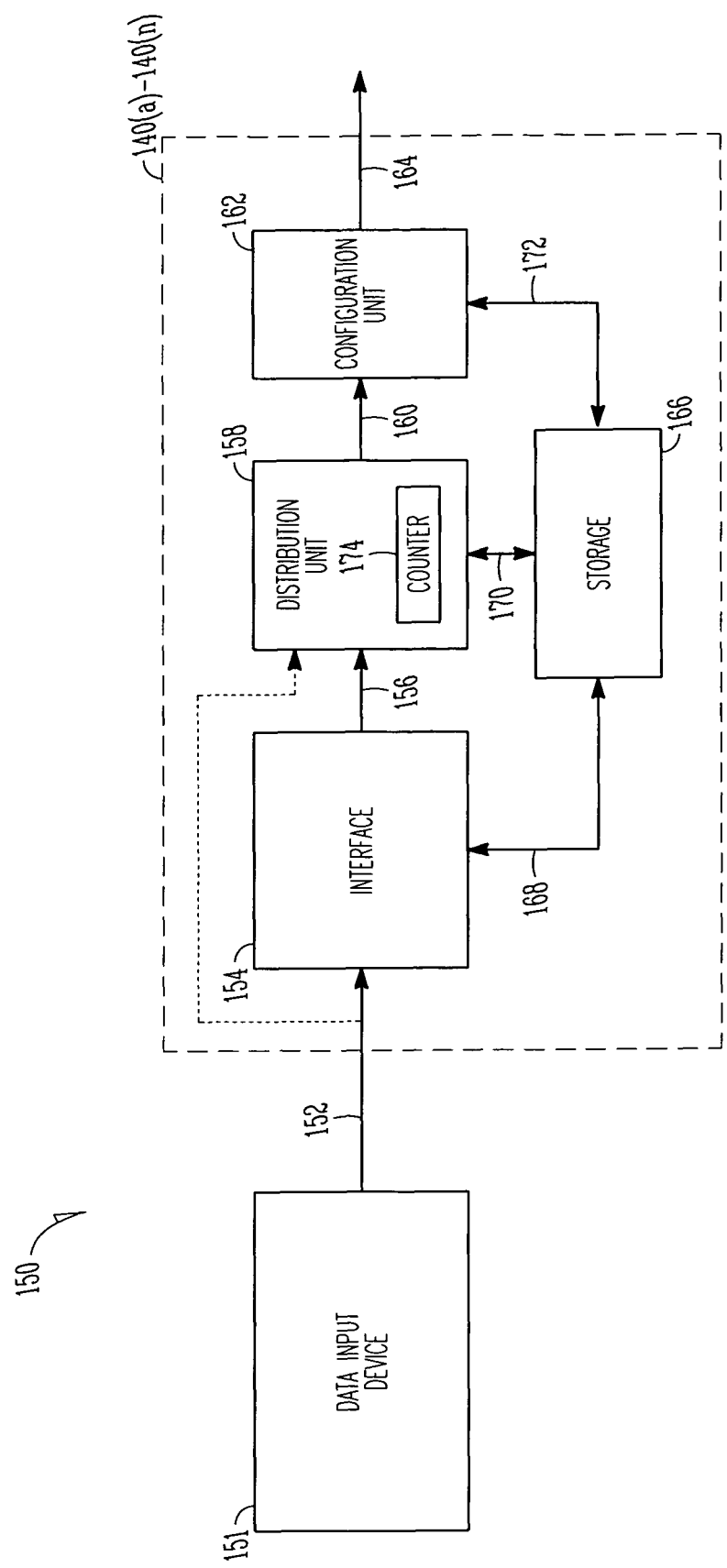
FIG. 2 illustrates an example embodiment of a reconfiguration unit in accordance with the disclosed subject matter hereof.

FIG. 2 illustrates an example embodiment of a reconfiguration unit 150. Reconfiguration unit 150 may be the reconfiguration units 140(a)-140(n) as shown in FIG. 1. Reconfiguration unit 150 is not limited to a particular type of device. In various embodiments, reconfiguration unit 150 may be a computer, including a keyboard, a mouse, a touch screen, or some other form of input device, and a display or some other form of output device. In various embodiments, reconfiguration unit 150 consists of software, including one or more software modules or programs. In various embodiments, the software of reconfiguration unit 150 resides on one or more different devices.

Reconfiguration unit 150 includes input 152 for receiving data and signals. Input 152 is not limited to any particular type of input, and may include a wireless connection, an input adapted to receive a storage media such as a floppy disk or a memory stick, or a transmission line. In various embodiments, input 152 may include an interface 154, although such an interface may not be required in all embodiments of reconfiguration unit 150.

In various embodiments, reconfiguration unit 150 may include a data input device 151 coupled to input 152. Data input device 151 is not limited to any particular type of device. In various embodiments, data input device 151 is a computer including a processor and one or more means for inputting data to the computer, including, but not limited to, a keyboard, a mouse, or a touch screen. In various embodiments, data input device 151 is coupled to, or is part of, a network, such as the network of FIG. 1, FIG. 3, or FIG. 4.

If present, interface 154 receives the data and signals provided at input 152. Interface 154 may perform one or more processing functions on the data or signals received at input 152. For example, interface 154 may receive input data in a particular format and process the data into a second and different format. Interface 154 may store data or signals received at input 152 in storage 166 through interconnect 168. Storage 166 is not limited to any particular type of storage. Storage 166 may include memory such as RAM memory.

If present, interface 154 is coupled to distribution unit 158 through interconnect 156. Interface 154 supplies data and signals to distribution unit 158. In embodiments where no interface is required, distribution unit 158 may be directly coupled to input 152 to receive data and signals. Distribution unit 158 may also retrieve data and store data to and from storage 166 through interconnect 170.

Distribution unit 158 is coupled to configuration unit 162 through interconnect 160. Distribution unit 158 supplies data and signals to configuration unit 162 through interconnect 160. Configuration unit 162 is coupled to output 164. Configuration unit 162 is also coupled to storage 166 through interconnect 172. Configuration unit 162 may store and retrieve data and signals to and from storage 166 through interconnect 172.

In various embodiments, distribution unit 158 includes one or more counters 174. Counters 174 may be used to provide a count of the number of times one or more subscribers on a network requested one or more channels over one or more time windows.

In operation, data, for example data associated with the viewership associated with one or more of a plurality of channels associated with a network, may be received at input 152. In addition, information relating to time of day, calendar information such as weekday and weekend dates, and information related to dates of holidays may be included. Information received at input 152 may also include information related to special events, for example major sporting, news, or political events. Information relating to changes in viewership based on historical trends, seasonal trends, or general viewership trends may be provided at input 152.

In various embodiments, some or all of the information received at input 152 may be stored in storage 166. Interface 154, if present, may process the information received at input 152. The information received at input 152, whether or not processed by interface 154, may be passed on to distribution unit 158. For example, interface 154 may pass to distribution unit 158 viewership information relating to viewership for a plurality of channels for one or more time windows, as further explained with reference to FIGS. 5-7. Distribution unit 158 receives the information provided by interface 154 and generates one or more relative viewership distributions, as further described with reference to FIGS. 5-7. In various embodiments, distribution unit 158 may retrieve some or all of the information necessary to generate the one or more relative viewership distributions from storage 166. In various embodiments, the generated relative viewership distributions are stored in storage 166.

The relative viewership distributions are provided to configuration unit 162. Configuration unit 162 also includes information regarding the configuration of the network associated with the channel viewership information. Information regarding the configuration of the network may include, but is not limited to, information regarding the location of the reconfigurable servers within the network. Information regarding the configuration of the network may include, but is not limited to, information regarding the various parameters associated with the servers, both reconfigurable and non-reconfigurable, within the network, including, but not limited to, such things as capacity of the servers within the network. Using the information regarding the configuration of the network and the generated one or more relative viewership distributions, configuration unit 162 determines the configuration settings for one or more of the reconfigurable servers in the network.

In various embodiments, these configuration settings are communicated to the network through output 164. In various embodiments, these configuration settings are stored in storage 166. Output 164 may be coupled to the network being configured by reconfiguration unit 150 by any type of interconnect suitable for transferring information between reconfiguration unit 150 and the network being reconfigured.

Figure 3:
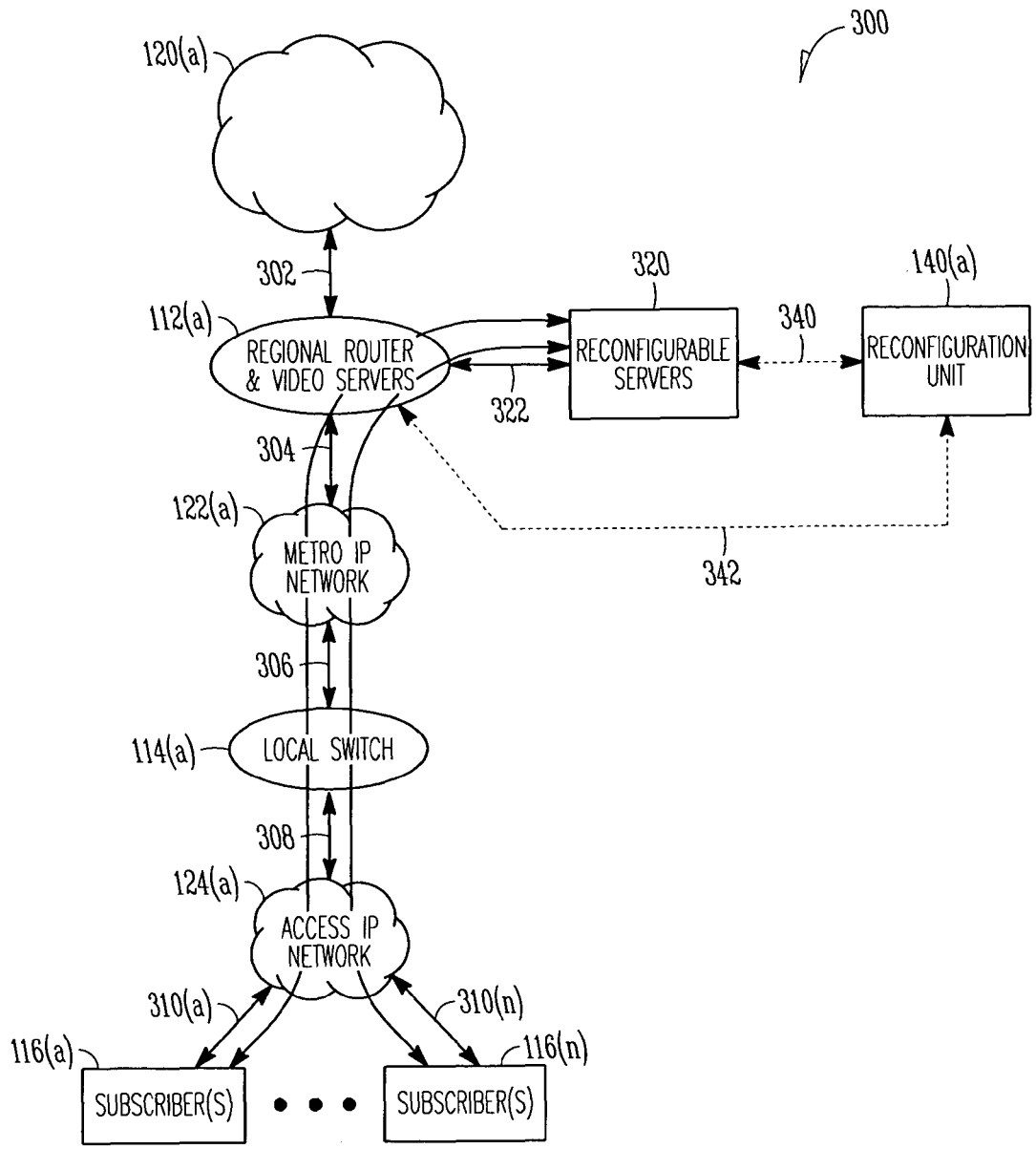
FIG. 3 illustrates an example embodiment of a network in accordance with the disclosed subject matter hereof.

FIG. 3 is an example embodiment of a network 300. Network 300 includes a backbone IP national network 120(*a*) coupled to regional router and video servers 112(*a*) by interconnect 302. Regional router and video servers 112(*a*) are coupled to metro IP network 122(*a*) by interconnect 304. Metro IP network 122(*a*) is coupled to local switch 114(*a*) by interconnect 306. Local switch 114(*a*) is coupled to an access IP network 124(*a*) through interconnect 308. Subscribers 116(*a*)-116(*n*) couple to access IP network 124(*a*) though interconnects 310(*a*)-310(*n*).

In various embodiments, regional routers and video servers 112(*a*) includes one or more types of servers, including, but not limited to, one or more video-acquisition server (A-server), video-distribution server (D-server), video-on-demand server (V-server), and one or more interactive advertising host servers. One or more reconfigurable servers 320 are coupled to regional router and video servers 112(*a*) by interconnect 322. In various embodiments, a network design algorithm may be used to determine a cost effective network design including a determination of the types and quantities of the various type servers to be included as part of the regional routers and video servers 112(*a*).

In various embodiments, reconfigurable servers 320 are coupled to a reconfiguration unit 140(*a*) by dotted line 340. In various embodiments, reconfiguration unit 140(*a*) is coupled to network 300 through dotted line 342. Dotted lines 340 and 342 are not limited to any particular type of interconnect, but may be any type of interconnect suitable for transferring signals to and from reconfiguration unit 140(*a*). Dotted lines 340 and 342 may include any of the types of interconnects described with respect to dotted line 142(*a*) in FIG. 1.

Referring again to FIG. 3, interconnects 302, 304, 306, 308, and 310(*a*)-310(*n*) are not limited to any particular type of interconnect, and may include any type or types of interconnects suitable for providing signal transmission at the level where each interconnect is being employed.

In various embodiments, interconnects 302, 304, 306, 308, and 310*a*-310*n* may include a plurality of types of interconnects. In various embodiments, the choice of interconnect is determined by the types of signals being transmitted. In various embodiments, interconnects are determined by factors including, but not limited to, the bandwidth or the speed requirements of the interconnect.

It would be understood that additional regional routers and video servers, for example regional routers and video server 112(*n*), and additional metro IP networks coupled to additional local switches, access IP networks, and additional subscribers, such as metro IP network 122(*n*), may be included in various embodiments described in conjunction with FIG. 3. These additional portions of the network are not illustrated in FIG. 3 for the sake of simplicity. However, various embodiments including these additional regional routers and video servers and associated additional networks, if any, may be included in one or more embodiments described in conjunction with FIG. 3.

In operation, reconfiguration unit 140(a) receives information relating to the existing arrangement of servers and routers included in network 300. Information relating to the arrangement of servers and routers is not limited to any particular type of information, but may include information regarding the number and types of each of the servers in network 300.

In addition, reconfiguration unit 140(a) receives information related to the viewership of one or more channels available through network 300 to subscribers 116(a)-116(n). Information relating to viewership is described in more detail below with respect to FIGS. 5-7. Information relating to viewership is not limited to being received by reconfiguration unit 140(a) from any particular source. In various embodiments, information related to viewership is received from network 300.

In addition, reconfiguration unit 140(a) may receive information related to viewership from a source external to network 300, for example, but not limited to, information stored on storage media, or information manually input into reconfiguration unit 140(a), for example by human data entry using a device external to network 300.

Using the information related to viewership, reconfiguration unit 140(a) will generate one or more relative viewership distributions. The relative viewership distributions indicate which of the plurality of channels being provided on network 300 are likely to be most demanded by subscribers 116(a)-116(n) for a given time window. Based on the generated relative viewership distributions, and the information with respect to the configuration of the servers included in network 300, reconfiguration unit 140(a) will determine configuration settings for one or more of the reconfigurable servers included in network 300. In various embodiments the reconfiguration setting will include information regarding a particular time period during with these reconfiguration settings will be applied in network 300.

In various embodiments, the reconfiguration settings will be determined so that at least a target number or greater of requests from subscribers 116(a)-116(n) may be provided to the requesting subscribers by servers located in reconfigurable servers 320 during any one of the particular time windows.

As requests for broadcast video streams are made by one or more subscribers 116(a)-116(n), the requests are satisfied by having one of the reconfigurable servers 320 provide the requested broadcast video stream if one of the reconfigurable servers 320 is configured to provide the channel supplying the requested broadcast video stream. By configuring the reconfigurable servers 320 to provide the most popularly requested channels, a high portion of the requests, referred to as the "target hit rate," may be provided by reconfigurable servers 320.

By reconfiguring the reconfigurable servers 320 for different time periods based on one or more shifting patterns for the most popularly requested channels over time, reconfigurable servers 320 may continue to provide the required channels at the target hit rate, despite the changing composition of the most popular channels being requested.

By maintaining the target hit rate, fewer servers may be needed in network 300 to provide responses to each of the subscriber's requests. Thus, overall cost for network 300 may be reduced. In addition, fewer servers also means fewer connections and fewer components to fail, thus increasing the reliability of network 300.

Figure 4:
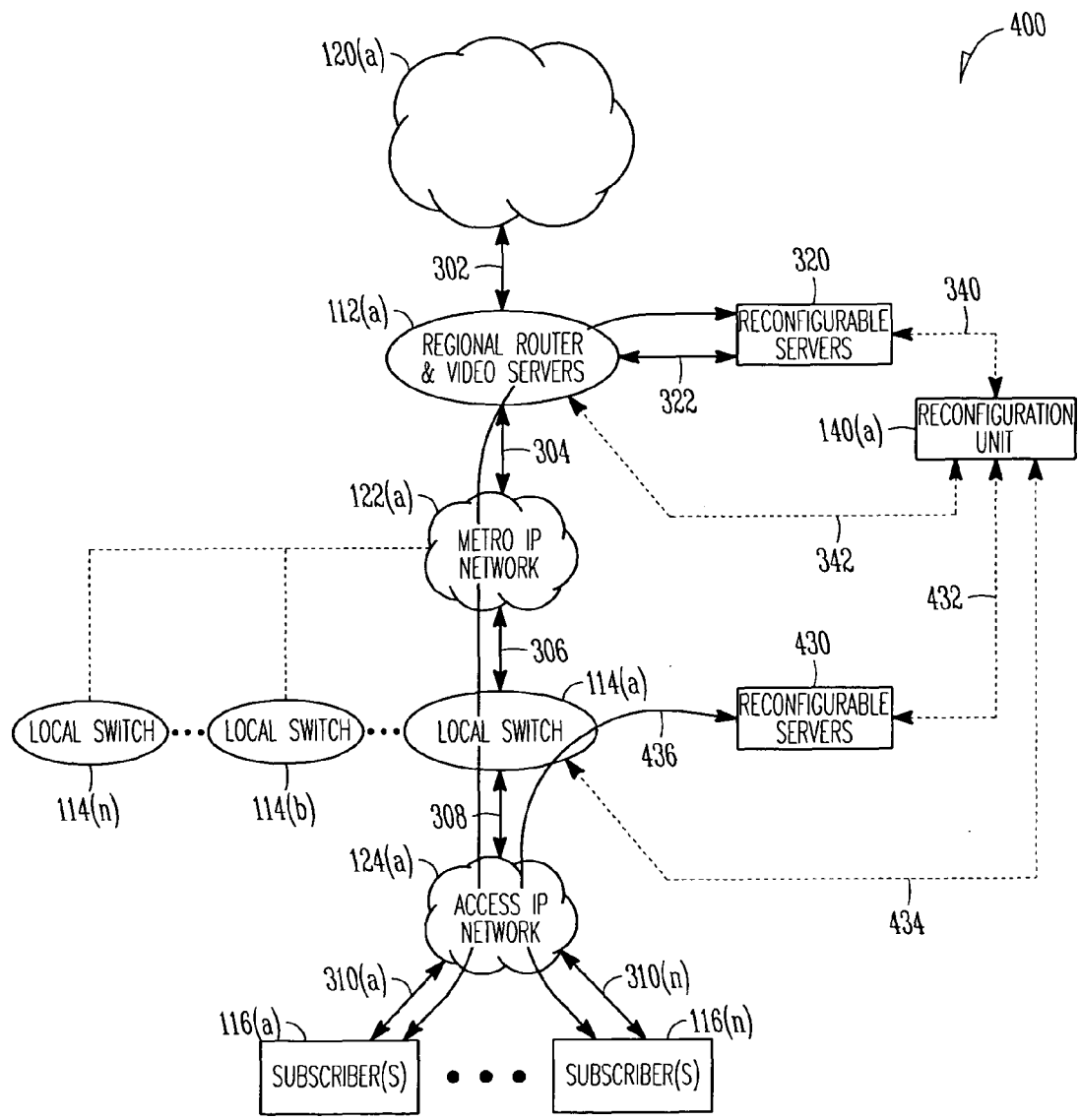
FIG. 4 illustrates an example embodiment of a network in accordance with the disclosed subject matter hereof.

FIG. 4 is an example embodiment of a network 400. Reference numbers used to describe features of FIG. 4 previously described in other figures are maintained as the same reference numbers in FIG. 4.

Network 400 includes the national network 120(a) coupled to the regional router and video servers 112(a), the metro IP network 122(a), local switch 114(a), access IP network 124(a), and the plurality of subscribers 116(a) - 116(n), interconnected as shown in FIG. 4.

Network 400 includes reconfigurable servers 320 coupled to regional routers and video servers 112(a) and coupled to reconfiguration unit 140(a). In addition, network 400 also includes one or more reconfigurable servers 430 coupled to local switch 114(a) through interconnect 436, and coupled to reconfiguration unit 140(a) through dotted line 432. In various embodiments, reconfiguration unit 140(a) may be coupled to network 400 at the local switch 114(a) through dotted line 434.

Reconfigurable servers 320 and 430 are not limited to any type of reconfigurable server. In an embodiment, the one or more servers included in reconfigurable servers 320 and 430 are D-servers.

In operation, reconfiguration unit 140(a) receives information relating to the existing arrangement of servers and routers included in network 400. Information relating to the arrangement of servers and routers is not limited to any particular type of information, but may include information regarding the number of and the types of each of the servers in network 400. The information relating to the arrangement of servers and routers would include information related to the reconfigurable servers 430 coupled to the local switch 114(a), and information related to the reconfigurable servers 320 coupled to regional router and video servers 112(a).

In various embodiments, reconfiguration unit 140(a) may also receive information related to any reconfigurable servers connected to any additional local switches, for example local switches 114(b)-114(n), if any, included in network 400.

In addition, reconfiguration unit 140(a) receives information related to the viewership of one or more channels available through network 400 to subscribers 116(a)-116(n). Information relating to viewership is described in more detail below with respect to FIGS. 5-7. Information relating to viewership is not limited to being received by reconfiguration unit 140(a) from any particular source. In various embodiments, information related to viewership is received from network 400. In various embodiments, viewership information is provided by one or more sources external to network 400.

Using the information related to viewership, reconfiguration unit 140(a) will generate one or more relative viewership distributions. The relative viewership distributions indicate which of the plurality of channels being provided on network 400 are likely to be most demanded by subscribers 116(a)-116(n) for a given time window. In addition, reconfiguration unit 140(a) may also generate one or more relative viewership distributions for each of the local switches 114(b)-114(n), if any additional local switches are present in network 400.

Based on the generated relative viewership distributions, and the information with respect to the configuration of the servers included in network 400, reconfiguration unit 140(a) will determine reconfiguration settings for one or more of the reconfigurable servers included in network 400. In various embodiments the reconfiguration settings will include information regarding a particular time period during which these reconfiguration settings will be applied in network 400.

In various embodiments, the reconfiguration settings will be determined so that at least a target number, or greater, of requests from subscribers 116(a)-116(n) will be provided by servers located in reconfigurable servers 430 during any one of the particular time windows.

As requests for broadcast video streams are made by one or more subscribers 116(a)-116(n), the requests are satisfied by having one of the reconfigurable servers 430 provide the requested broadcast video stream if one of the reconfigurable servers 430 is configured to provide the channel supplying the requested broadcast video stream. By configuring the reconfigurable servers 430 to provide the most popularly requested channels, a high portion of the requests, or the "target hit rate" may be provided by reconfigurable servers 430.

By reconfiguring the reconfigurable servers 430 for different time periods based on one or more shifting patterns for the most popularly requested channels, reconfigurable servers 430 may continue to provide the required channels at the target hit rate despite the changing composition of the most popular channels being requested.

In addition to the advantages discussed with regards to FIG. 3, by locating reconfigurable servers 430 closer to the subscribers, the load on network 400 is reduced, because the servers providing the greatest load are located closest to the subscribers. As a result, the load on the metro IP network 122(a) in network 400 is reduced.

Further, by placing the servers providing the greatest load close to the subscriber, service quality to the subscriber is improved. Service quality includes, but is not limited to, faster response and fewer dropped packets in the broadcast data stream. Fever dropped packets result in fewer retransmission requests, wherein re-transmission requests consume network resources.

In the event that a request from one or more of the subscribers 116(a)-116(n) is not available from one of the reconfigurable servers 430, the request can be passed along up network 400 to be provided by reconfigurable servers 320, or by additional servers included in regional routers and video servers 112(a).

Reconfiguration unit 140(a) may provide a configuration setting for multiple sets of reconfigurable servers attached to each of a plurality of local switches, for example 114(b)-114(n). In various embodiments, the configuration setting for each of the local switches is designed to allow a target hit rate at each of the local switches based on the channel viewership information for the subscribers coupled to each particular local switch. Information transferred between reconfiguration unit 140(a) and each of the local switches 114(b)-114(n) can occur through the network 400, or by any means described above for transferring information to and from reconfiguration unit 140(a).

In various embodiments, reconfiguration unit 140(a) may determine configuration settings for reconfigurable servers 320, reconfigurable servers 430, and any additional reconfigurable servers, including additional reconfigurable servers coupled to local switches 114(b)-114(n), or another level in network 400, in such a manner as to achieve a desired level for one or more characteristics associated with network 400. For example, reconfiguration unit 140(a) may configure the reconfigurable servers in network 400 in order to minimize the total number of servers, or the total number of reconfigurable servers required to service the requests from the subscribers. In another example, reconfiguration unit 140(a) may configure the reconfigurable servers in network 400 in order to minimize the signal load or the bandwidth requirements of one or more tiers within network 400.

The basis for determination of the configuration settings is not limited to any particular criteria. Algorithms and tools to formulate the configuration settings of network 400 may include any criteria, parameters, and factors that are appropriate for the network being configured.

Figure 5:
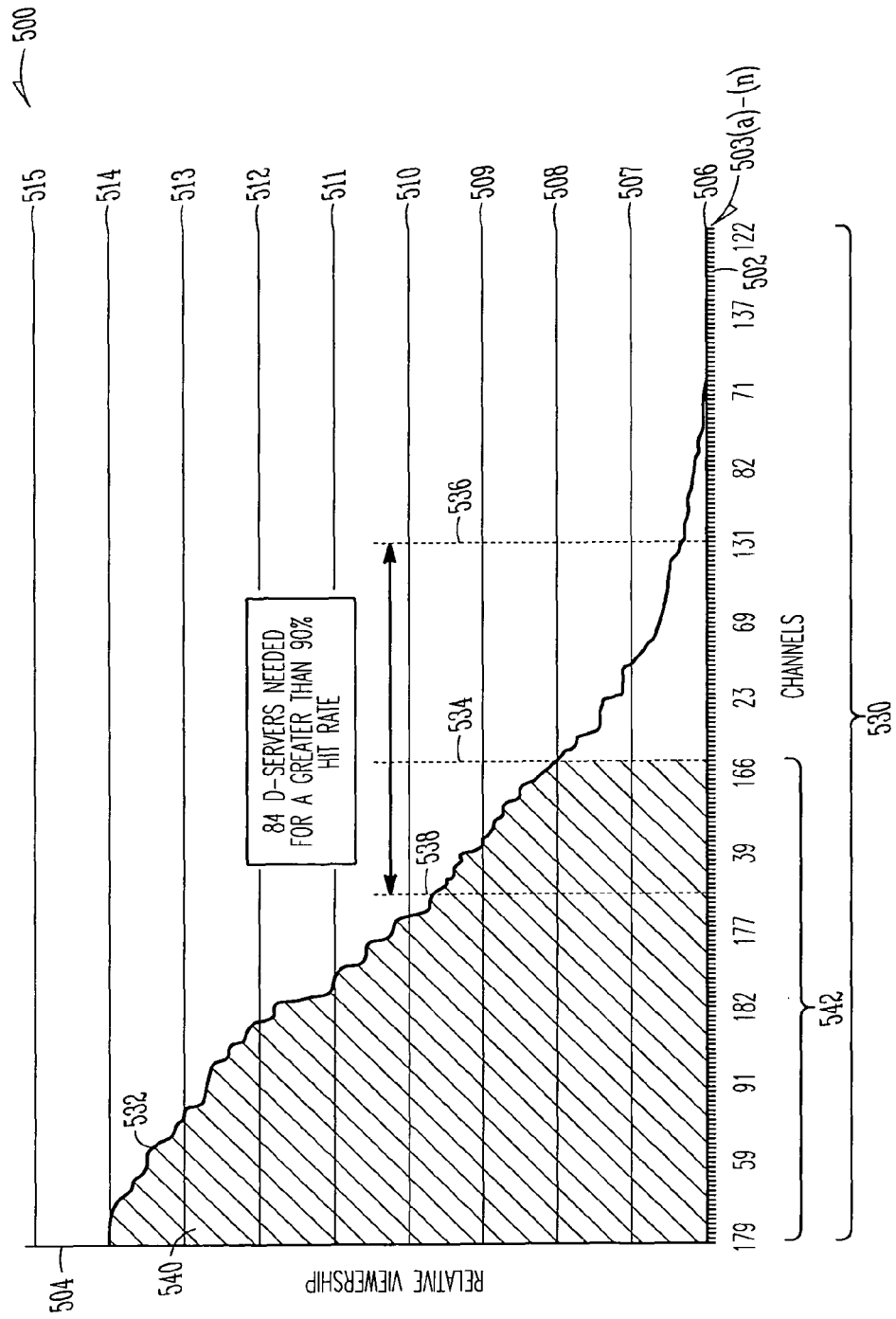
FIG. 5 illustrates an example embodiment of a relative viewership distribution in accordance with the disclosed subject matter hereof.

FIG. 5 is an example embodiment of a relative viewership distribution 500. Example distribution 500 includes a horizontal axis 502, and a vertical axis 504. In example distribution 500, horizontal axis 502 represents an arrangement of a plurality of channels 530. The plurality of channels 530 is not limited to a particular number of channels. In an embodiment, the plurality of channels 530 is the number of channels available on a network, such as, but not limited to, the networks illustrated in FIG. 1, FIG. 3, or FIG. 4, as described above. The plurality of channels 530 is not limited to a plurality of channels including consecutively numbered channels. As illustrated in example distribution 500, each channel included in example distribution 500 is represented by a vertical line "tick" mark 503(a)-(n), extending below horizontal axis 502, wherein (n) represents the number of channels included in the plurality of channels 530.

The arrangement of the plurality of channels 530 is not limited to any particular arrangement or order. In example distribution 500, the arrangement of the plurality of channels 530 is shown as arranged along horizontal axis 502 with the channel having the highest relative viewership on the left, and decreased in order of relative viewership along the horizontal axis by proceeding to the right along horizontal axis 502. The term relative viewership refers to some measure of the viewership of a particular channel relative to the viewership of one or more other channels when the viewership of the one or more other channels is measured using the same measurement as applied to the particular channel. In various embodiments, channel viewership is represented by the number of times any subscriber on a particular network initially requests the particular channel for which the relative viewership is being determined during a certain time period. However, channel viewership information is not limited to any particular type of information, and may include, but is not limited to, information gathered regarding viewership of channels (i.e., using some type of polling or rating service), or by actual monitoring and recording of the channel requests as they occur on the network. The time period is not limited to a particular length of time. For example, a certain time period for which channel viewership of a channel is determined may be a one week time period, or a one hour time period, or a one-half hour time period.

As an example, but not limited to this example, relative viewership for a plurality of channels may be determined by counting the number of times each channel is viewed by the subscribers within a given time window, for example but not limited to the one week time period mentioned above. Each time a subscriber switches to the particular channel in the plurality of channels during the given time window, a count for the particular channel is incremented. At the end of the time window, the channel viewership for the particular channel is determined based on the count. The relative viewership may be determined for any number of additional channels, using the same time period by employing a separate count for each of the additional channels for which relative viewership is to be determined. At the end of the time period, a measure of the relative viewership may be determined for each of the number of additional channels.

The result of the relative viewership for each of the channels may be arranged as shown in example distribution 500 by arranging the channels along horizontal axis 502 in an order representing the channel with the highest level of relative viewership leftmost on the horizontal axis 502, and placing the remaining channels in order of descending relative viewership by proceeding in the right-hand direction along horizontal axis 502. However, the arrangement of the channels is not limited to a left to right arrangement as described above. The relative arrangement may be highest to lowest relative viewership moving from right to left along horizontal axis 502, or any other arrangement.

Example distribution 500 may include level indicators 506-515. Level indications 506-515 indicate the relative levels of viewership indicated along vertical axis 504. Level indicators 506-515 are not limited to any particular measure of relative viewership. In various embodiments, level indicators 506-515 are the counts for the plurality of channels 530 determined for a particular time period, for example, but not limited to, the one week time period as described above. In various embodiments, level indicators 506-515 are a measure of relative viewership for the plurality of channels 530 derived from the counts for the viewership of the plurality of channels 530 determined for a particular time period.

Line 532 in example distribution 500 represents the relative viewership level for each of the plurality of channels 530 for the time period determined for the particular time period represented by example distribution 500. In example distribution 500, line 532 appears as a continuous line. However, line 532 may also be discrete data points representing the relative viewership level for each of plurality of channels 530. Line 532 is shown as a continuous line in FIG. 5 for illustration purposes so as to show the relative differences and the trends in relative viewership for the plurality of channels 530. One or more smoothing techniques or interpolation techniques may be applied to the data representing the relative viewership levels for the plurality of channels 530 in order to obtain line 532 as a continuous line as shown in FIG. 5.

Once the relative viewership distribution of one or more channels has been determined, various determinations may be made. For example, a point along the relative viewership line can be determined that will result in a particular hit rate. The term hit rate means a measurement of the portion of the viewership that would be included in the measurement of total viewership for a particular time period. For example, point 534 in FIG. 5 could represent a greater than ninety percent portion of the total viewership for the time window represented by example distribution 500. The greater than ninety percent relative viewership is represented by shaded area 540 in FIG. 5. The greater than ninety percent relative viewership would be represented by the relative viewership for the plurality of channels included in channel subset 542 for the particular time period represented in example distribution 500.

Other hit rates, either higher or lower than the hit rate represented by point 534, may also be determined. For example, point 538 in FIG. 5 represents a lower hit rate than that represented by point 534. In addition, point 536 represents a higher hit rate than that which is represented by point 534 in FIG. 5. The determination of a point along line 532 is not limited to any particular hit rate.

Using the relative viewership information determined for a particular time period, and being able to calculate various hit rates based on the relative viewership information, one or more other determinations may be made. For example, a determination as to the number of servers required to service a particular hit rate may be determined. For a network with a particular configuration and for which example distribution 500 applies, it may be determined that 84 servers would be required to be configured for the channels included in channel subset 542 in order to achieve the greater than ninety percent hit rate.

As noted above, in determining an example distribution, a particular time period is chosen over which to monitor and collect the measurement of relative viewership of the channels. As longer time periods for determining the relative viewership are used, the distribution of viewership has a larger variance than for shorter time periods. For longer time periods, viewing patterns are not concentrated on a few channels. Over a longer time period, even the infrequently viewed channels, for example the special interest channels, will get some viewers. This large variance among the viewership of the various channels indicates that over a long time there is less coherence among the viewers in their viewing preferences.

For example, if a one week time period is used to determine relative viewership, the time period would include weekend viewership measurements. Weekend viewership may include more viewership of specialty channels, for example sports channels, wherein the particular programs of interest may occur on weekends. In addition, viewers may have time on the weekends to watch specialty channels, for example channels related to gardening or cooking, wherein they would not take the time on a weekday to view such channels. Thus, over a time period such as a week, or a month, or even a year, the viewership of the channels under consideration will show less variation as compared to the viewership for example over a single day.

In addition, viewership over an entire day may show more variation among the channels under consideration than for viewership for a shorter time period, for example, a particular hour of a day. By way of example, the relative viewership distribution at 5:00 pm may be heavily skewed toward the channels providing news, wherein many viewers at that time of day may be getting home from work and would want to see the news events for the day. At some later time in the evening, say at 8:00 pm., the variation in the channels requested by subscribers may be more varied as subscribers interests may be less directed toward a channel providing any particular type of broadcast.

It is to be understood that example distribution 500 is not limited to the configuration as shown in FIG. 5. For example, in various embodiments, channels may be represented as arrangement of channels along a vertical axis, and relative viewership may be represented along the horizontal axis. In addition, embodiments of the invention are not limited to two axis charts. Any arrangement for displaying data, including but not limited to histograms and pie charts, may be used to represent the relative viewership of the plurality of channels.

Figure 6:
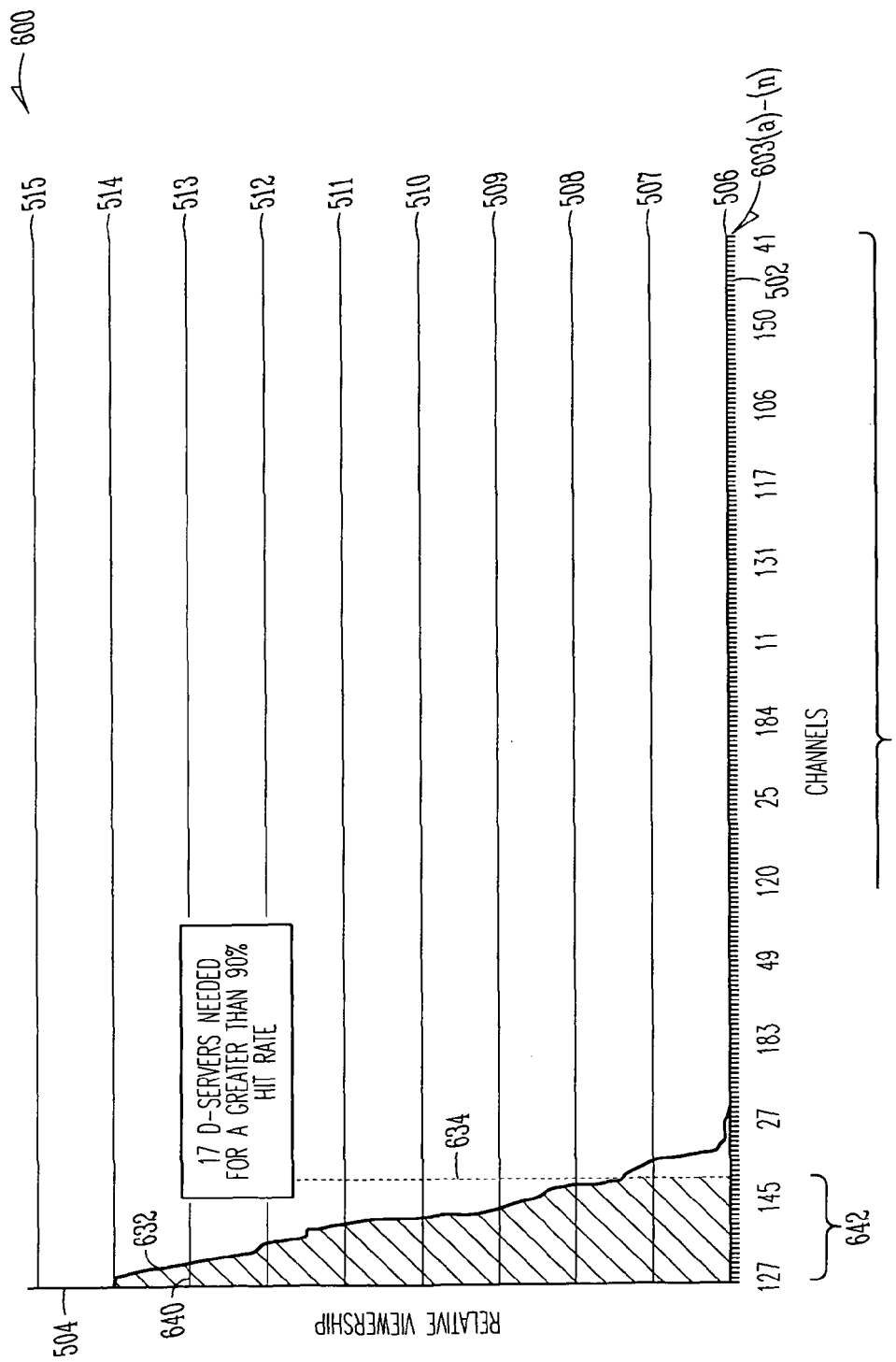
FIG. 6 illustrates an example embodiment of a relative viewership distribution in accordance with the disclosed subject matter hereof.

FIG. 6 is an example distribution 600 according to one or more embodiments of the present invention. Example distribution 600 includes horizontal axis 502 and vertical axis 504. In example distribution 600, horizontal axis 502 represents an arrangement of a plurality of channels 630. The plurality of channels 630 is not limited to a particular number of channels. In an embodiment, the plurality of channels 630 is the number of channels available on a network, such as, but not limited to, the networks as illustrated in FIG. 1, FIG. 3, or FIG. 4 as described above. The plurality of channels 630 is not limited to a plurality of channels including consecutively numbered channels. As illustrated in example distribution 600, each channel included in example distribution 600 is represented by a vertical line "tick" mark 603(a)-(n), extending below horizontal axis 502, wherein (n) represents the number of channels included in the plurality of channels 630.

As in FIG. 5, vertical axis 504 in FIG. 6 represents a measure of relative viewership, and includes level indicators 506-515. However, in FIG. 6, vertical axis 504 and level indicators 506-515 are used to indicate the relative viewership of the plurality of channels 630 over a particular time period. In various embodiments, the particular time period over which the relative viewership of the plurality of channels 630 is determined is shorter than the time periods used in determining the relative viewership for example distribution 500 in FIG. 5.

Returning the FIG. 6, the plurality of channels 630 are arranged along horizontal axis 502 wherein the leftmost channel represents the channel with the highest relative viewership during the particular time period used in determining the relative viewership for example distribution 600, and the remaining channels are arranged from left to right in decreasing order of relative viewership for the particular time period used in determining relative viewership for example distribution 600. Line 632 is used to represent the smoothed trend representing the relative viewership of the plurality of channels 630 in example distribution 600. Point 634 is used to represent the greater than ninety percent hit rate for the example distribution 600. Shaded area 640 represents the portion of the relative viewership representative of a greater than ninety percent hit rate.

The subset of channels 642 represents the group of channels representing the number of the channels having the highest relative viewership for example distribution 600 that would be included in order to have a greater than ninety percent hit rate. A comparison of example distribution 600 with example distribution 500 of FIG. 5 illustrates that example distribution 600 requires a less number of channels included in the subset of channels 642 required to achieve the greater than ninety percent hit rate as compared to the number of channels in channel subset 542. For example, in FIG. 5, the number of channels in channel subset 542 required to achieve a greater than ninety percent hit rate was eighty four channels. In FIG. 6, the number of channels in channel subset 642 required to achieve the greater than ninety percent hit rate was seventeen channels.

Because less channels are required to be provided in example distribution 600 in order to achieve the greater than ninety percent hit rate, a smaller number of servers are required to achieve the greater than ninety percent hit rate. For the example distribution 600 of FIG. 6, a greater than ninety percent hit rate may be achieved using just 17 servers, as compared to the 84 servers required in FIG. 5. By reducing the time period over which the measurements for relative viewership is determined, the number of servers required to achieve a greater than ninety percent hit rate may be reduced. This reduction in the number of required servers reduces cost and system complexity while increasing the reliability of the system by reducing the number of components and connections that may fail.

In addition, it is noted that the arrangement with regards to the order of the plurality of channels 630 is different from the order of the plurality of channels 530 in FIG. 5. For example, the channel in FIG. 6 that has the highest relative viewership is channel 127, wherein the channel with the highest relative viewership in FIG. 5 is channel 179. The difference in arrangement of the plurality of channels is attributed to the time period over which the measurements of the relative viewership is taken. As noted above, the time period over which the measurement for example distribution 600 are taken is shorter than the period over which the measurements for example distribution 500 is taken. In various embodiments, the time period over which measurements are taken for example distribution 600 may be one hour. For any particular hour, the arrangement of channels may be represented by the plurality of channels 630 as illustrated in FIG. 6. However, the arrangement of channels for another one hour time period, for example the one hour time period immediately following an example one hour time period that may be represented in FIG. 6, may have a different arrangement of the plurality of channels if arranged in left to right order of decreasing relative viewership. In addition, a subset of channels that represents a greater than ninety percent hit rate for the next one hour time period may include more or less channels, and may include one or more different channels, as the subset of channels represented by the subset of channels 642 in FIG. 6.

In an example wherein the subsequent one hour time period includes a subset of channels that does not exceed 17 channels as illustrated by subset 642 in FIG. 6, but that includes one or more different channels, a greater than ninety percent hit rate could still be achieved using the same 17 servers as used to achieve the greater than ninety percent hit rate during the time period represented by example distribution 600 if one or more of the servers could be re-configured so that the servers during the second one hour time period now serve the channels represented by the 17 or fewer channels making up the subset of channels forming the greater than ninety percent hit rate during the second time period. Further, by continuing to reconfigure the servers based on the highest relative viewership determined for any particular time period, a high hit rate may be achieved while employing a smaller number of servers than would be required if the servers where not reconfigured for different time periods.

In various embodiments, the reconfigurable servers are located at the tier closest to the subscriber, and are reconfigured for any given time period in order to achieve the highest possible hit rate. The time period is not limited to any particular time period. In addition, the time period is not limited to be same length time period for any given day, or for any given time of day. In various embodiments, any given day, week, month, or year may include a plurality of time periods of various lengths.

In various embodiments, the length of the time period will be adjusted based on the number of subscribers requesting broadcast video streams from the network.

In various embodiments, the length of the time period will be adjusted to consider special events, including but not limited to major sporting events, political events, or other broadcasts expected to have a large interest by subscribers.

In various embodiments, the channel preferences of the subscribers are determined for each time of the day and for each day of the week. Seasonal adjustment (i.e., summer viewing habits versus winter viewing habits of subscribers) may also be considered. A channel viewership distribution may be generated for each time interval, using for example the method described in conjunction with example distribution 600 of FIG. 6. Based on these calculated channel viewership distributions, along with information regarding the configuration and types of servers available on the network, and analysis that may consider historical distributions or viewing patterns over the last several weeks or months, the reconfigurable servers on a given network are reconfigured just before any upcoming time period to correspond to the N most popular channels for the upcoming time period, where N is a subset of channels having the highest viewership for the upcoming time period.

Figure 7:
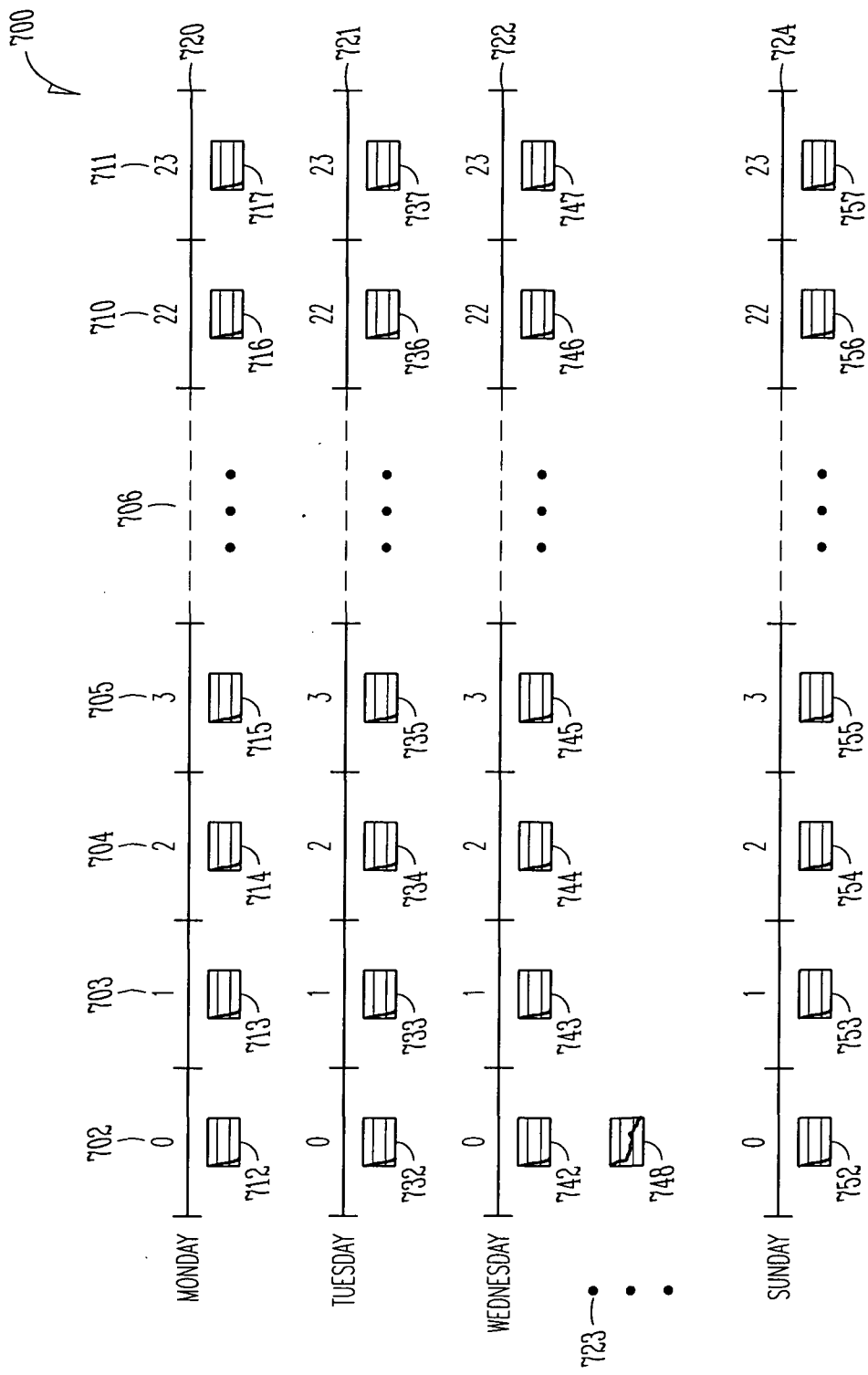
FIG. 7 illustrates an example embodiment of a pictorial representation of a plurality of relative viewership distributions in accordance with the disclosed subject matter hereof.

FIG. 7 illustrates a pictorial representation 700 of a plurality of relative viewership distribution generated for a plurality of time periods. Pictorial representation 700 includes horizontal axes 720-722 and 724. Dotted line 723 represents one or more additional horizontal axes between 722 and 724. In an embodiment, each of the horizontal axes 720-722, 724, and the horizontal axes represented by dotted line 723 represent a day of the week. For example, horizontal axis 720 may represent Monday, horizontal axis 721 may represent Tuesday, horizontal axis 722 may represent Wednesday, horizontal axis 724 may represent Sunday, and dotted line 723 may represent axes not shown for Thursday, Friday, and Saturday.

In addition, each horizontal axis in FIG. 7 may be divided in a plurality of time periods, represented by time periods 702-705, 710-711, and dotted lines 706. Dotted lines 706 represents one or more time periods between time period 705 and time period 710. In an embodiment, each of time periods 702-705, 710-711 and dotted lines 706 may be one hour time periods representing the 24 hours in each day. The time periods are not limited to any particular time period. In various embodiments, the time periods may be one-half hour time periods, or less. In addition, in various embodiments, the time periods for any given day may be of various lengths of time. In various embodiments, the time period, for example time period 702, may be of different lengths for different days. For example, time period 702 may be a one hour time period on the day represented by horizontal axes 720, and may be a one-half hour time period on the day represented by horizontal axis 724. In various embodiments, the pictorial representation represented in FIG. 7 may be applied to determine the configuration of one or more reconfigurable servers repeatedly over the given time period. For example, the pictorial representation of FIG. 7 may be used to determine the re-configuration of one or more reconfigurable servers in a particular network for one or more consecutive weeks.

In FIG. 7, a relative viewership distribution is generated for each time period. For example, relative viewership distribution 712 is illustrated as the relative viewership distribution for time period 702 on Monday. Additional relative viewership distributions 713-717, 732-737, 742-747, and 752-757 may be generated for each of the time periods illustrated in FIG. 7. One or more additional relative viewership distributions may also be generated for additional time periods associated with the time periods represented by dotted lines 706. In various embodiments more than one relative viewership distribution may be generated for a particular time period and a particular day. For example, time period 702 associated with axis 722 is associated with two different relative viewership distributions, 742 and 748. In this example, two different relative viewership distribution may be generated because two different local switches, such as illustrated in network 400 of FIG. 4, would require a different relative viewership distribution during a same time period of a same day.

In various embodiments, one or more of the relative viewership distributions of FIG. 7 may be modified in one or more time periods in consideration of special events, seasonal viewing habits, number of subscribers viewing a particular channel, or another factor that would have an effect on viewership during the time period in question.

Figure 8A:
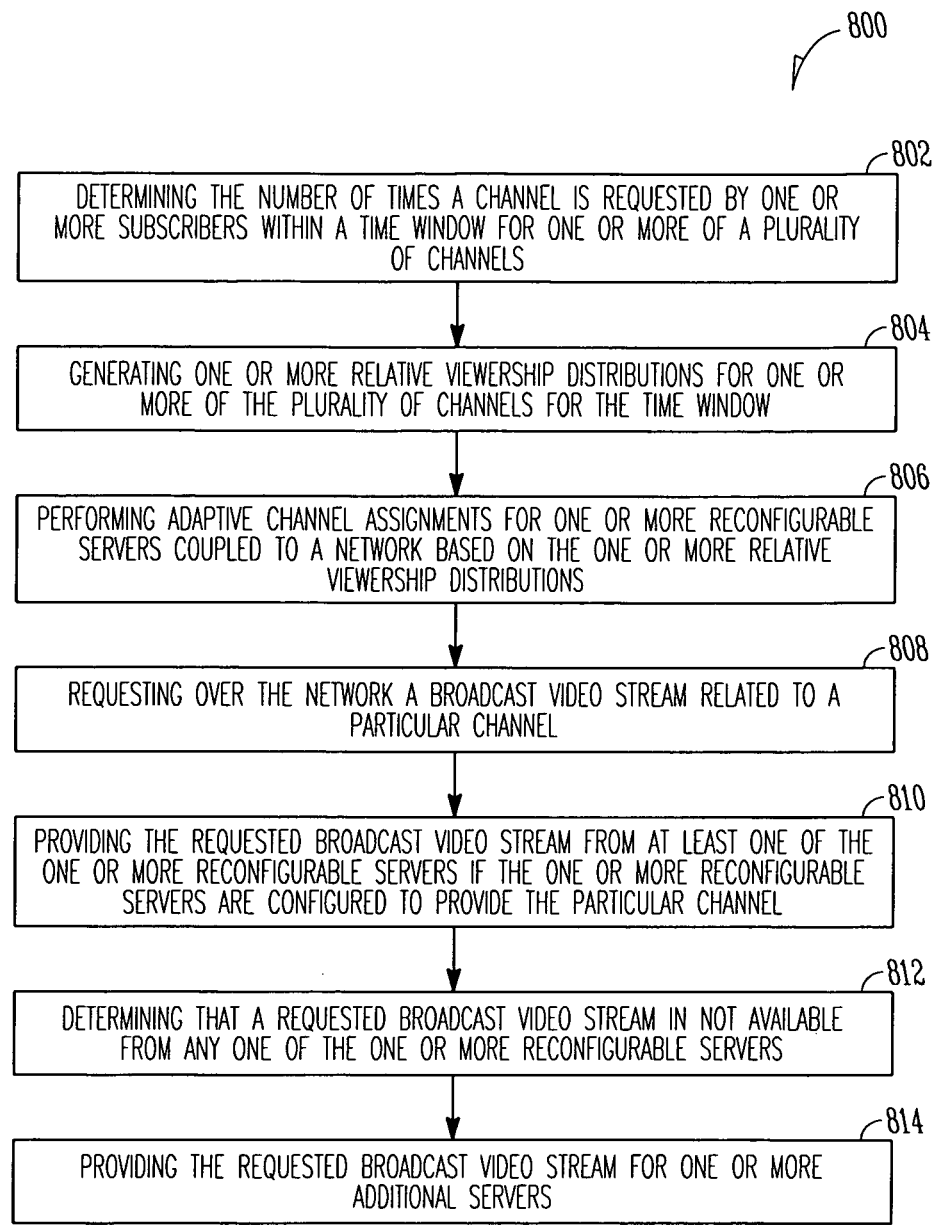
FIG. 8A illustrates an example embodiment of a method in accordance with the disclosed subject matter hereof.

FIG. 8A illustrates an example method 800. Method 800 at block 802 includes determining the number of times a channel is requested by any subscribers within a time window for one or more of a plurality of channels. Method 800 at block 804 includes generating one or more relative viewership distributions for one or more of the plurality of channels for the time window. Method 800 at block 806 includes performing adaptive channel assignments for one or more reconfigurable servers coupled to a network based on the one or more relative viewership distributions.

Method 800 at block 808 includes requesting over the network a broadcast video stream related to a particular channel. Method 800 at block 810 includes providing the requested broadcast video stream from at least one of the one or more reconfigurable servers if the one or more reconfigurable servers are configured to provide the particular channel. Method 800 at block 812 includes determining that a requested broadcast video stream is not available from any one of the one or more reconfigurable servers. Method 800 at block 814 includes providing the requested broadcast video stream for one or more additional servers.

Figure 8B:
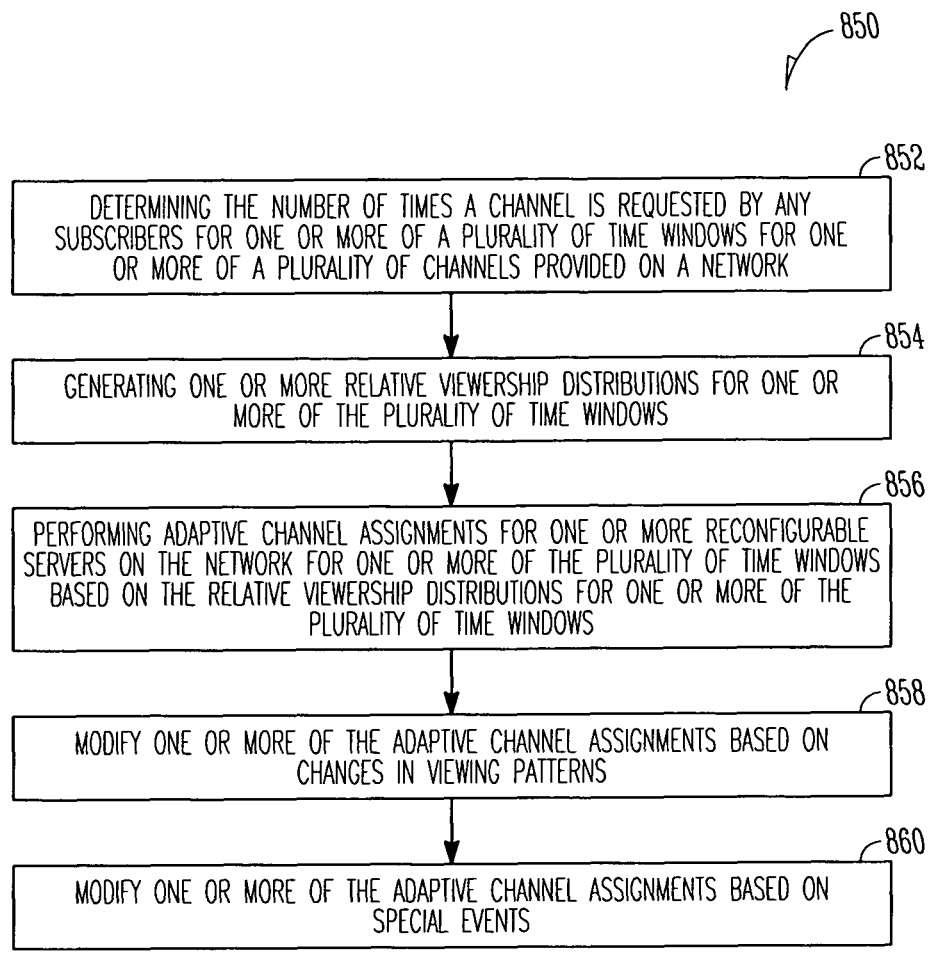
FIG. 8B illustrates an example embodiment of a method in accordance with the disclosed subject matter hereof.

FIG. 8B illustrates an example method 850. Method 850 at block 852 includes determining the number of times a channel is requested by any subscribers for one or more of a plurality of time windows for one or more of a plurality of channels provided on a network. Method 850 at block 854 includes generating one or more relative viewership distributions for one or more of the plurality of time windows. Method 850 at block 856 includes performing adaptive channel assignments for one or more reconfigurable servers on the network for one or more of the plurality of time windows based on the relative viewership distributions for one or more of the plurality of time windows. Method 850 at block 858 includes modifying one or more of the adaptive channel assignments based on changes in viewing patterns. Method 850 at block 860 includes modifying one or more of the adaptive channel assignments based on special events.

Figure 9:
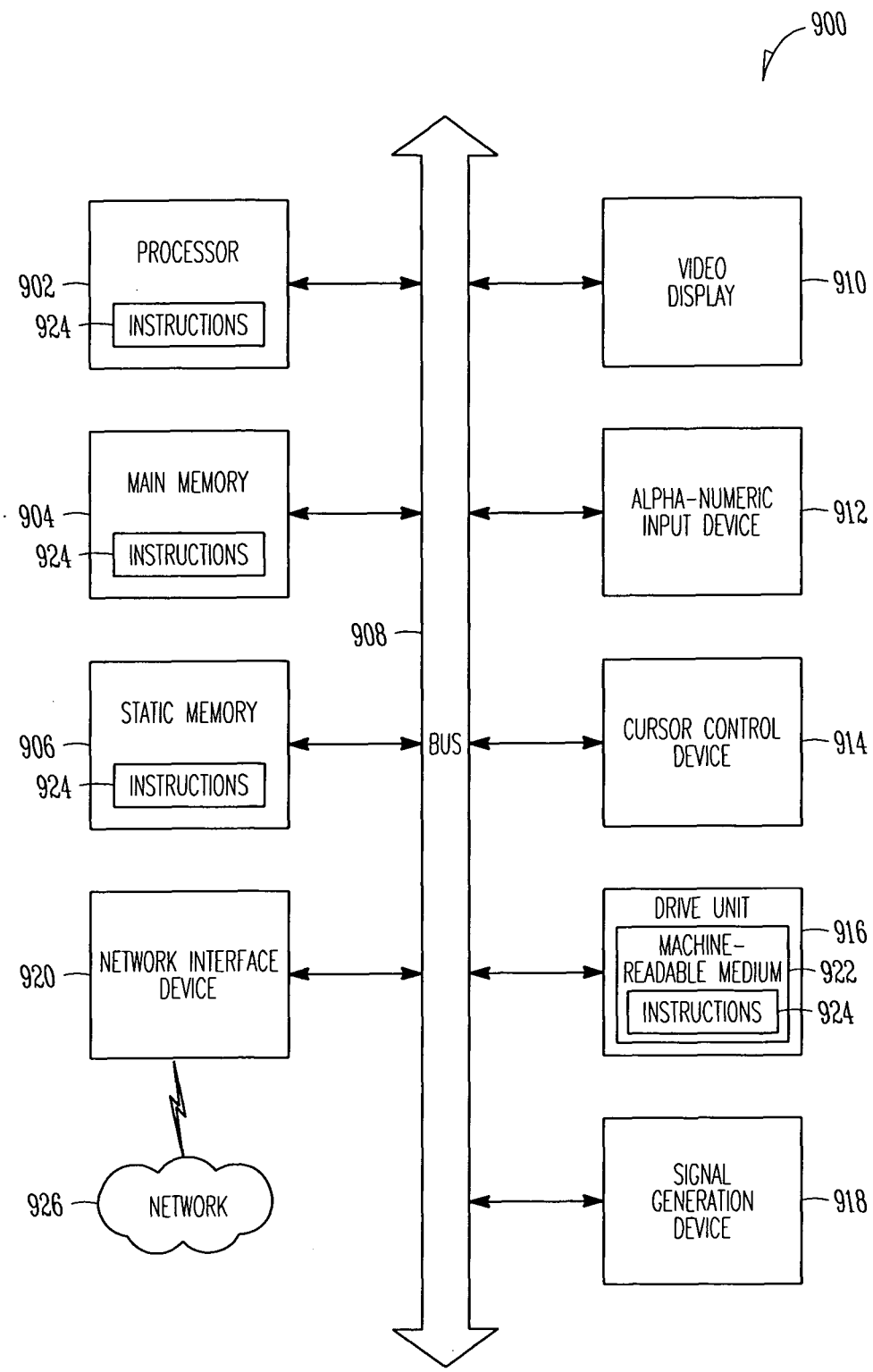
FIG. 9 illustrates an example embodiment of a computing system in accordance with the disclosed subject matter.

Referring now to FIG. 9, a diagrammatic representation of a machine is shown in the example form of a computer system 900 of a type sufficient for use in any of the example embodiments set forth herein. Computer system 900 may include a set of instructions for causing the machine to perform any one or more of the methodologies discussed herein that may be executed. In alternative embodiments, the machine operates as a standalone device or may be connected (e.g., networked) to other machines. In a networked deployment, the machine may operate in the capacity of a server, a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions and data structures (e.g., software 924) embodied or utilized by any one or more of the methodologies or functions described herein. The software 924 may also reside, completely or at least partially, within the main memory 904, and/or within the processor 902, during execution thereof by the computer system 900. The main memory 904 and the processor 902 also constituting machine-readable media.

The software 924 may further be transmitted or received over a network 926 via the network interface device 920 utilizing any one of a number of well-known transfer protocols, for example, the hyper text transfer protocol (HTTP). While the machine-readable medium 922 is shown in an example embodiment to be a single medium, the term "machine-readable medium" as an article of manufacture should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

Thus, as described above, an apparatus, system, and method for adaptive video-server reconfiguration for self-optimizing multi-tier networks is disclosed. While the example embodiments herein are generally illustrated in the environment of an IPTV system, in an alternative embodiment a cable distribution system or satellite distribution system may be used instead. Such a system may or may not use IPTV methodologies. Further, the IPTV may be delivered over-the-air using, for example, broadband wireless telecommunications techniques.

Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. An apparatus comprising:
  a processor; and
  a memory that stores executable instructions that, when executed by the processor, facilitate performance of operations, comprising:
    detecting a transition to a first time period of a plurality of time periods associated with a predefined schedule of a plurality of channels that are used for delivery of media content to a plurality of subscriber devices by a content provider network;
    selecting a first configuration set from a plurality of configuration sets according to the first time period that is detected, wherein the plurality of configuration sets are associated with the plurality of time periods, and wherein each configuration set of the plurality of configuration sets is determined by:
      receiving data associated with selections of the plurality of channels by the plurality of subscriber devices within a past plurality of time periods;
      determining a relative viewership distribution for each past time period of the past plurality of time periods based on the data associated with the selections, wherein the relative viewership distribution arranges the plurality of channels according to numbers of selections by the plurality of subscriber devices;
      identifying a set of frequently requested channels of the plurality of channels for each past time period according to the relative viewership distribution, wherein the set of frequently requested channels correspond to providing a target percentage of total channel traffic for the plurality of channels to the plurality of subscriber devices;
      determining a total number of reconfigurable servers of a plurality of reconfigurable servers of the content provider network that are required for providing the set of frequently requested channels to the plurality of subscriber devices;
      assigning the frequently requested channels to a group of reconfigurable servers of the plurality of reconfigurable servers according to the total number of reconfigurable servers that is determined for providing the set of frequently requested channels; and
      generating the configuration set of the plurality of configurations sets for configuring the group of reconfigurable servers of the plurality of reconfigurable servers according to the assigning of the frequently requested channels; and
    transmitting the first configuration set to the plurality of reconfigurable servers to cause a first set of the frequently requested channels to be assigned to a first group of the plurality of reconfigurable servers such that the target percentage of the total channel traffic for the plurality of channels is predictably provided to the plurality of subscriber devices according to the data associated with the selections of the plurality of channels during the past plurality of time periods.

2. The apparatus of claim 1, wherein the data associated with the selections further comprises a number of requests for a broadcast video stream during a second time window for each of a plurality of additional channels.

3. The apparatus of claim 1, wherein the relative viewership distribution corresponds to probabilities of selection for each channel of the plurality of channels during a second time window.

4. The apparatus of claim 1, wherein the data associated with the selections is obtained by monitoring a plurality of requests by the plurality of subscriber devices during the past plurality of time periods.

5. The apparatus of claim 1, wherein the operations further comprise modifying the relative viewership distribution for the past time period.

6. The apparatus of claim 5, wherein the modifying of the relative viewership distribution is associated with a special event that is broadcast on a channel of the plurality of channels.

7. The apparatus of claim 5, wherein the modifying of the relative viewership distribution is associated with a seasonal viewing habit of the plurality of subscriber devices.

8. The apparatus of claim 1, wherein the relative viewership distribution is determined based on a historical averaging of the data associated with the selections over the past time period for two weeks.

9. The apparatus of claim 1, wherein the operations further comprise applying one of a smoothing technique, an interpolation technique, or a combination thereof to the data associated with the selections.

10. The apparatus of claim 1, wherein the apparatus is further coupled to the plurality of reconfigurable servers through a plurality of local switches.

11. The apparatus of claim 1, wherein the data associated with the selections is received by monitoring over the content provider network the selections by the plurality of subscriber devices coupled to the content provider network.

12. A machine-readable storage device, comprising executable instructions that, when executed by a processor, facilitate performance of operations, comprising:
- detecting a first time period of a plurality of time periods associated with a plurality of channels that are used for delivery of media content to a plurality of subscriber devices by a content provider network;
- selecting a first configuration set from a plurality of configuration sets according to the first time period that is detected, wherein the plurality of configuration sets are associated with the plurality of time periods, and wherein each configuration set of the plurality of configuration sets is determined by:
  - receiving data associated with selections of the plurality of channels by the plurality of subscriber devices within a past plurality of time periods;
  - determining a relative viewership distribution for each past time period of the past plurality of time periods based on the data associated with the selections;
  - identifying a set of frequently requested channels of the plurality of channels for each past time period according to the relative viewership distribution, wherein the set of frequently requested channels correspond to providing a target percentage of total channel traffic for the plurality of channels to the plurality of subscriber devices;
  - determining a total number of reconfigurable servers of a plurality of reconfigurable servers of the content provider network that are required for providing the set of frequently requested channels to the plurality of subscriber devices;
  - assigning the frequently requested channels to a group of reconfigurable servers of the plurality of reconfigurable servers according to the total number of reconfigurable servers that is determined for providing the set of frequently requested channels; and
  - generating the configuration set of the plurality of configurations sets for configuring the group of reconfigurable servers of the plurality of reconfigurable servers according to the assigning of the frequently requested channels; and
- transmitting the first configuration set to the plurality of reconfigurable servers to cause a first set of the frequently requested channels to be assigned to a first group of the plurality of reconfigurable servers such that the target percentage of the total channel traffic for the plurality of channels is predictably provided to the plurality of subscriber devices according to the data associated with the selections of the plurality of channels during the past plurality of time periods.

13. The machine-readable storage device of claim 12, wherein a the relative viewership distribution arranges the plurality of channels according to numbers of selections by the plurality of subscriber devices.

14. The machine-readable storage device of claim 13, wherein a first of the plurality of reconfigurable servers is located in a first tier of the content provider network that is closest to the plurality of subscriber devices coupled to the content provider network.

15. The machine-readable storage device of claim 12, wherein the operations further comprise modifying the relative viewership distribution for the past time period.

16. The machine-readable storage device of claim 15, wherein the modifying of the relative viewership distribution is associated with a special event that is broadcast on a channel of the plurality of channels.

17. The machine-readable storage device of claim 15, wherein the modifying of the relative viewership distribution is associated with a seasonal viewing habit of the plurality of subscriber devices.

18. The machine-readable storage device of claim 12, wherein the relative viewership distribution is determined based on a historical averaging of the data associated with the selections over the past time period for two weeks.

19. A method comprising:
- detecting, by a system comprising a processor, a first time period of a plurality of time periods associated with a plurality of channels that are used for delivery of media content to a plurality of subscriber devices by a content provider network;
- selecting, by the system, a first configuration set from a plurality of configuration sets according to the first time period that is detected, wherein the plurality of configuration sets are associated with the plurality of time periods, and wherein each configuration set of the plurality of configuration sets is determined by:
  - receiving, by the system, data associated with selections of the plurality of channels by the plurality of subscriber devices within a past plurality of time periods;
  - determining, by the system, a relative viewership distribution for each past time period of the past plurality of time periods based on the data associated with the selections;
  - identifying, by the system, a set of frequently requested channels of the plurality of channels for each past time period according to the relative viewership distribution, wherein the set of frequently requested channels correspond to providing a target percentage of total channel traffic for the plurality of channels to the plurality of subscriber devices;
  - determining, by the system, a total number of reconfigurable servers of a plurality of reconfigurable servers of the content provider network that are required for providing the set of frequently requested channels to the plurality of subscriber devices;
  - assigning, by the system, the frequently requested channels to a group of reconfigurable servers of the plurality of reconfigurable servers according to the total number of reconfigurable servers that is determined for providing the set of frequently requested channels; and
  - generating, by the system, the configuration set of the plurality of configurations sets for configuring the group of reconfigurable servers of the plurality of reconfigurable servers according to the assigning of the frequently requested channels; and
- transmitting, by the system, the first configuration set to the plurality of reconfigurable servers to cause a first set of the frequently requested channels to be assigned to a first group of the plurality of reconfigurable servers such that the target percentage of the total channel traffic for the plurality of channels is predictably provided to the plurality of subscriber devices according to the data associated with the selections of the plurality of channels during the past plurality of time periods.

20. The method of claim 19, wherein the relative viewership distribution arranges the plurality of channels according to numbers of selections by the plurality of subscriber devices.

21. The method of claim 20, further comprising modifying the relative viewership distribution for the past time period.

22. The method of claim 21, wherein the modifying of the relative viewership distribution is associated with a special event that is broadcast on a channel of the plurality of channels.

23. The method of claim 21, wherein the modifying of the relative viewership distribution is associated with a seasonal viewing habit of the plurality of subscriber devices.

24. The method of claim 20, wherein a length of time for the first time period varies according to a day of a week.

25. The method of claim 19, wherein a performance of the plurality of reconfigurable servers is modified based on a special event.

26. The method of claim 19, wherein the determining the relative viewership distribution comprises counting a number of times that the plurality of subscriber devices select a particular channel of the plurality of channels during the past time period.

27. The method of claim 19, further comprising applying one of a smoothing technique, an interpolation technique, or a combination thereof to the data associated with the selections.

28. A method, comprising:
  receiving data associated with selections of a plurality of channels by a plurality of subscriber devices within a past plurality of time periods for delivery of media content to the plurality of subscriber devices by a content provider network;
  determining a relative viewership distribution for each past time period of the past plurality of time periods based on the data associated with the selections;
  identifying a set of frequently requested channels of the plurality of channels for each past time period according to the relative viewership distribution, wherein the set of frequently requested channels correspond to providing a target percentage of total channel traffic for the plurality of channels to the plurality of subscriber devices;
  determining a total number of reconfigurable servers of a plurality of reconfigurable servers of the content provider network that are required for providing the set of frequently requested channels to the plurality of subscriber devices;
  assigning the frequently requested channels to a group of reconfigurable servers of the plurality of reconfigurable servers according to the total number of reconfigurable servers that is determined for providing the set of frequently requested channels; and
  generating a configuration set of a plurality of configurations sets for configuring the group of reconfigurable servers of the plurality of reconfigurable servers according to the assigning of the frequently requested channels.

* * * * *